Patented Sept. 25, 1951

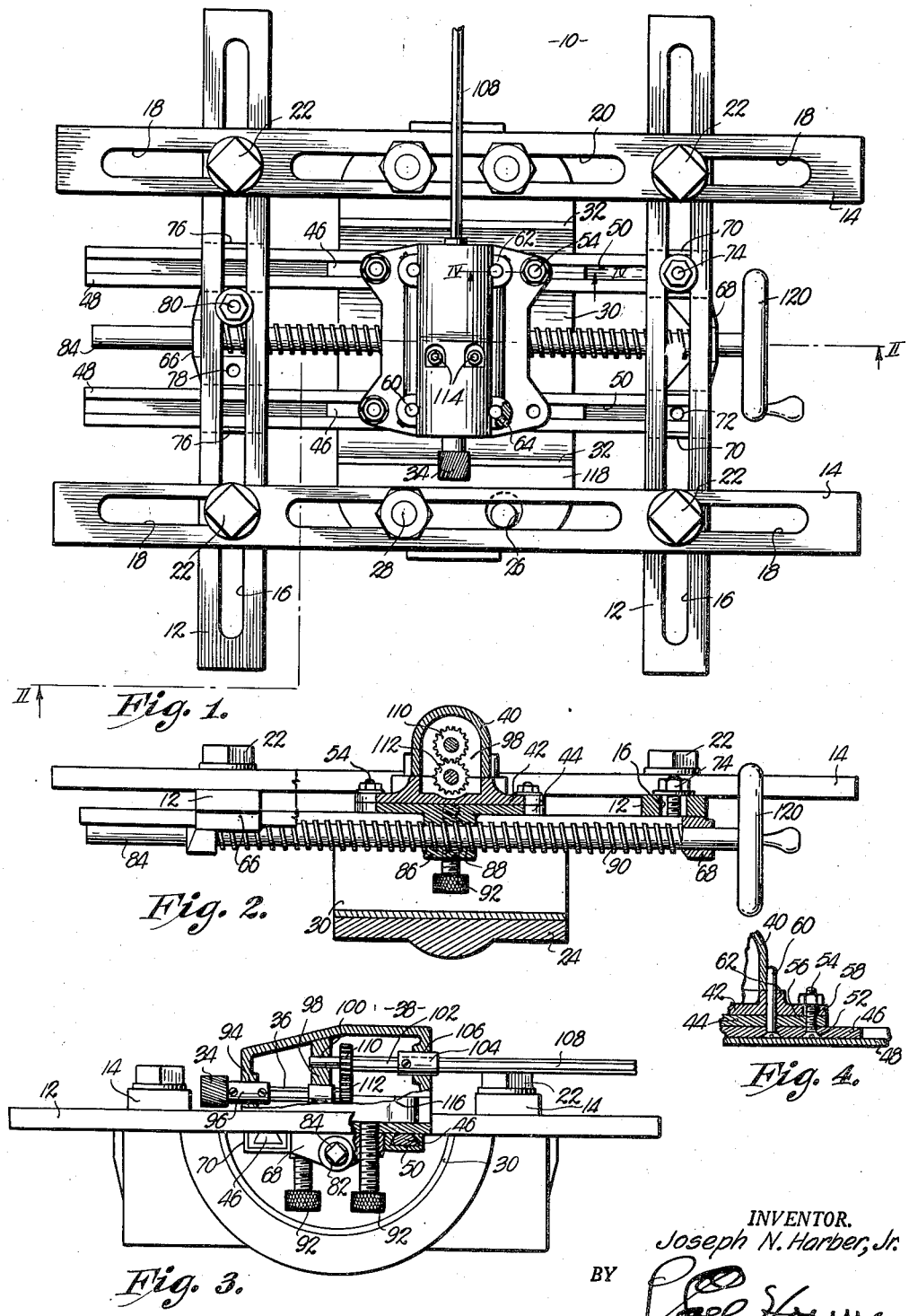

2,569,238

UNITED STATES PATENT OFFICE 2,569,238

MACHINE TOOL FOR ENGINE BEARINGS

Joseph N. Harber, Jr., Seminole, Okla.

Application March 1, 1948, Serial No. 12,427

2 Claims. (Cl. 90—12)

This invention relates broadly to machinists' tools and more particularly to a machine for trimming bearings particularly those used in internal combustion engines, the primary object being to provide means for fitting sleeves or inserts in such bearings.

It is well known to those skilled in the art that internal combustion engines having bearings provided with removable and replaceable inserts will not operate successfully unless such replaced inserts are fitted with high precision. Although a given insert is ordinarily designed to fit properly in a given bearing, nevertheless, a certain amount of trimming of such insert must take place when the same is placed in its bearing, otherwise a true fit is not presented. These inserts are semi-circular in cross section and when the same are placed in the bearings prior to final assembling of the two parts of the bearing cap, the longitudinal edges thereof extend above the adjacent edge of the bearing cap and it is these edges that must be trimmed down to a predetermined distance from the proximal edge of the bearing cap prior to final assembly.

It is the most important object of this invention therefore, to provide a machine for trimming such edges of the bearing insert quickly, easily and precisely, eliminating the heretofore tedious job of grinding such edges by hand with a file or the like.

Another important object of this invention is the provision of a tool for trimming bearings having a rotatable cutting or milling tool mounted for reciprocation across the edge of the insert to be ground and provided with specially formed structure permitting accurate adjustment not only with respect to positioning of the milling tool with respect to the insert, but in the amount of said edge to be cut away.

A further object of this invention is the provision of a tool for trimming bearings having a reciprocable body provided with a rotatable milling tool, said body being removably mounted to the end that the entire unit may be shifted to cut both edges of the insert without the necessity of removing the bearing from its mounted position.

Other objects of this invention include the manner in which the reciprocable body and its entire actuating means is movable toward and from the insert edge to be cut; the way in which the tool will accommodate virtually any size bearing; the manner in which the body is adjustably moved toward and from the insert as cutting takes place; and many minor details of construction, all of which will be made clear or become apparent during the course of the following specification, reference being had to the accompanying drawing, wherein:

Fig. 1 is a top plan view of a machine tool for engine bearings made in accordance with the present invention.

Fig. 2 is a cross-sectional view taken on irregular line II—II of Fig. 1.

Fig. 3 is an end elevational view thereof, parts being broken away to reveal details of construction; and Fig. 4 is a fragmentary detailed cross-sectional view taken on line IV—IV of Fig. 1 looking in the direction of the arrows.

In the drawing the numeral 10 designates broadly a frame including a pair of spaced apart bars 12 and a second pair of spaced bars 14 disposed in intersecting relationship with the longitudinal axes of the two substantially parallel bars 12. The bars 12 each have an elongated longitudinally disposed opening 16 formed therein and extending virtually the entire length of such bars 12. The bars 14 are each provided with a pair of end slots 18 and a central elongated slot 20, these slots 18 and 20 all being disposed longitudinally in the respective bars 14.

Four bolts or the like 22, serve to interconnect the bars 12 and 14. These bolts 22 pass through the slots 18 of the bars 14 and through the slots 16 of the bars 12 as is clearly indicated in Fig. 1 of the drawing.

It is clear from the foregoing that not only the bars 12 may be moved toward and from each other but the bars 14 are likewise shiftable toward and away from each other.

An industrial type internal combustion engine bearing 24 having openings 26 formed therein in the usual manner is illustrated in the drawing. This bearing 24 is secured to the framework 10 by a number of bolts or the like 28 passing through the openings 26 of bearing 24 and through the slots 20 of each of the bars 14. Thus, the bearing 24 is shiftable longitudinally along the bars 14 and the length of slots 20 render it possible for the tool to accommodate virtually any size bearing.

The bearing 24 is provided with a semi-circular insert 30 in the usual manner and it is the edge 32 of this insert 30 that is to be cut away by a relatively small milling cutter 34. This cutter 34 is removably secured to a stub shaft 36 mounted within a body broadly designated by the numeral 38. This body 38 includes a hollow sectional housing 40 having a base 42 that rests directly upon a plate 44. This plate 44 has substantially the same peripheral contour as the base 42 indicated in Fig. 1 of the drawing and is secured to a pair of spaced apart members 46 that are slidably mounted in a pair of guides 48.

As clearly indicated in Fig. 3, the members 46 are interlocked with the members 48 in dovetail fashion, the guides 48 having longitudinal slots 50 for slidably receiving the respective members 46. The members 46 each have a pair of spaced apart openings 52 for receiving bolts 54 that pass upwardly through threaded openings 56 in the plate 44 and loosely through openings 58 in the base plate 42 of housing 40. Guide pins 60 secured to the members 46 as clearly illustrated in Fig. 4, pass upwardly through aligned openings in plate 44, base 42 and bosses 62 formed integrally with the housing 40 above the base 42 thereof.

Each of these bosses 62 is provided with a set screw 64 serving to secure the housing 40 to the guide pins 60. The elongated tracks 48 are disposed in underlying relationship to the bars 12 and in substantial parallelism with and between the two spaced bars 14. These tracks 48 are secured to the bars 12 by means of a pair of brackets 66 and 68. The bracket 68 is provided with a pair of spaced apart U-shaped portions 70, turned upwardly to receive a respective track 48 and these portions 70 are each provided with an opening in alignment with an opening 72 formed in the track 48 for receiving a bolt or the like 74. This bolt 74 that passes through the portion 70 of bracket 68 extends upwardly through opening 72 of track 48 and through the slot 16 of one of the bars 12. Thus the two tracks 48 and the bracket 68 are shiftable longitudinally along the said one bar 12, carrying the body 38 and cutter 34 toward and away from the proximal edge 32 of sleeve 30.

The bracket 66 is formed similarly to the bracket 68 in that it is provided with a pair of U-shaped portions 76 for slidably receiving the respective track 48. This bracket 66 is not secured direct to the tracks 48 however, but have a pair of spaced apart openings 78 for receiving bolts or the like 80, which bolts 80 pass upwardly through the slot 16 of the other bar 12 rendering such bracket 66 slidable longitudinally along this bar 12.

The bracket 68 is provided with a centrally disposed opening 82 for rotatably receiving one end of an elongated screw 84. This screw 84 is also rotatably mounted in a like opening (not shown) formed in the bracket 66.

A projection 86 depending from the lowermost face of the plate 44 has an internally tapped bore 88 therethrough for receiving threads 90 of the screw 84. A pair of screws 92 threaded into the projection 86 and plate 44 extend upwardly into contacting relationship with the lowermost face of the base 42. A bearing 94 formed in one end of the hollow housing 40 receives a bushing 96 for removably mounting the cutter 34 disposed exteriorly of housing 40. This bushing 96 interconnects shaft 36 and the cutter 34 and shaft 36 within the housing 40, is journaled within a bearing 98. This bearing 98 is in two parts, one part thereof being secured directly to the base 42 of housing 40 and the other section of bearing 98 being secured directly to the innermost face of the top wall of housing 40. An opening 100 formed in this last mentioned section of bearing 98 journals a shaft 102 that extends outwardly in opposed relationship to the shaft 36 and thereabove and is received by a bushing 104 journaled in a bearing 106 within the housing 40. This bushing 104 receives a shaft 108 which in turn is joined to a suitable prime mover not shown, such as an electric hand drill.

The shafts 36 and 102 are connected by means of a pair of inner-meshing gears 110 and 112 respectively. A pair of bolts 114 passing downwardly through the housing 40 interconnect the two sections of bearing 98 and serves to hold the housing 40 upon the base plate 42 thereof. It is to be noted that the housing 40 terminates at the lowermost end thereof at a line 116 that divides the bearing 94 into two semi-circular segments.

When a new insert 30 is first placed in the bearing 24, the edges 32 thereof extend a slight distance above the proximal edge 118 of the bearing cap 24. When this bearing cap 24 is attached to its opposed segment, this insert 30 is forced into setting relationship with the cap 24 but oftentimes, the edges 32 of sleeve 30 extend upwardly above edge 118 of cap 24 a distance too great to permit a tight and accurate fit when the bearing is assembled around its shaft. Thus, after the insert 30 is moved into the position illustrated in the drawing, the cap 24 is attached to the frame-work 10 in the manner above described. After the bearing cap 24 is so mounted upon the frame 10, the cutter 34 is moved to a position in overlying engageable alignment with one of the edges 32 of the insert 30. This is accomplished by loosening bolts 74 and 80 and sliding the tracks 48 along the bars 12. The body 38 is then raised by loosening of the set screws 64 and bolts 54 and manipulating thumb screws 92. The set screws 64 are then re-set and the body 38 reciprocated to move cutter 34 along the proximal edge 32 of insert 30 by rotation of the screw 84. This rotation is accomplished manually by turning of a wheel 120 and when the cutter 34 is caused to rotate simultaneously, this edge 32 of the insert 30 will be cut away. The body 38 is gradually lowered by manipulation of the thumb screws 92 and each time resetting the screws 64 until the desired amount of the edge 32 of insert 30 has been trimmed. To the end that a predetermined amount of the insert 30 is allowed to extend above the edge 118 of bearing cap 24, after the cutting operation has been completed, a shim (not shown) is inserted between the base 42 of housing 40 and the plate 44. When the body 38 has been lowered to a position where base 42 rests upon such shim through manipulation of the thumb screws 92, the set screws 64 are set and the last cutting operation upon the edge 32 of insert 30, takes place. After one edge 32 of the insert 30 has been so cut away to a predetermined distance above edge 118 of cap 24, the entire body 38 is lifted from the plate 44 and turned to a position where the cutter 34 overlies the other edge 32 of insert 30. This is accomplished by loosening the bolts 54 and set screws 64, whereupon body 38 may be lifted and replaced upon the dowels 60. The cutting of this other edge 32 of insert 30 is accomplished in the same manner as above described by the manipulation of thumb screws 92, set screws 64 and bolts 54.

It is apparent from the foregoing that inserts 30 may be quickly and easily trimmed through use of the tool forming the subject matter of this invention and that such edges 32 will be positively smooth and straight and will remain projected above the edges 118 of cap 24 predetermined equal distances when the trimming action has been completed. The entire assembly is easily used since in all respects the same may be adjusted to receive virtually any type and size of bearing that might have inserts which must be trimmed before final assembly.

Having thus described the invention, what is claimed as new and desired to be secured by Letters Patent is:

1. A bearing insert trimmer comprising a frame including a pair of spaced, elongated, longitudinally slotted bars; releasable means in the slot of each bar respectively and slidable therein when released for joining a bearing having an insert to said pair of bars; a second and a third elongated, longitudinally-slotted bar, both crossing said pair of bars; releasable means within the slots of the bars at each point of crossing respectively and slidable therein when released for interconnecting the bars; a pair of spaced guides disposed in parallelism with said pair of bars; a pair of brackets for the guides; releasable means in the slot of said second bar and slidable therein when released for joining one of the brackets and the guides to said second bar; releasable means in the slot of said third bar and slidable therein when released for joining the other bracket to the third bar, said guides being slidable on their longitudinal axes in said second bracket; a cutter body carried by the guides for reciprocation on said axes of the latter; a rotatable cutter on the body disposed for cutting engagement with said bearing insert upon reciprocation of the body; and an elongated screw rotatably carried by the brackets and operably connected with said body for reciprocating the same.

2. A bearing insert trimmer as set forth in claim 1 wherein is provided a supporting plate on the guides for said body, said screw being coupled with the plate, said plate being provided with screw means engageable with the body for shifting the latter and the cutter carried thereby toward and away from the guides and the bearing on an axis perpendicular to said axes of the guides.

JOSEPH N. HARBER, JR.

REFERENCES CITED

The following references are of record in the file of this patent:

UNITED STATES PATENTS

| Number | Name | Date |
|--------|------|------|
| 810,903 | Blechschmidt | Jan. 30, 1906 |
| 1,444,649 | Younger | Feb. 6, 1923 |
| 1,669,194 | Froussard | May 8, 1928 |
| 2,128,023 | Specht et al. | Aug. 23, 1938 |
| 2,373,341 | Rowe | Apr. 10, 1945 |